Jan. 3, 1956  A. M. CHAMBERS, JR., ET AL  2,729,478
PACKING CONSTRUCTION
Filed May 21, 1953

INVENTORS.
Albert M. Chambers, Jr.
BY John J. Patrick

Robert Henderson

ATTORNEY.

United States Patent Office 2,729,478
Patented Jan. 3, 1956

2,729,478
PACKING CONSTRUCTION

Albert M. Chambers, Jr., and John J. Patrick, Palmyra, N. Y., assignors to The Garlock Packing Company, Palmyra, N. Y., a corporation of New York Application May 21, 1953, Serial No. 356,532

6 Claims. (Cl. 286—26)

The present invention relates to packing assemblies employing packing rings which are circular in cross-section and are commonly referred to as O rings.

While such O rings have heretofore been made and quite successfully used when formed of relatively soft rubber, or equivalent rubber-like material, which is readily deformable, the use of such relatively soft material introduces problems that have been quite troublesome. For example, when relatively soft rubber is employed to form such a packing ring for effecting a seal between relatively reciprocating members such as a piston and a cylinder within which the piston operates, the relatively high frictional coefficient of such rubber-like material requires good lubrication to minimize wear and power losses. Also, the rubber-like material breaks down quite quickly in service despite all efforts to avoid such breakdown. In addition, it is usually necessary to select, for each given use for sealing a particular fluid, a particular rubber-like material which will be most resistant to breakdown or decomposition by such fluid material.

The present invention, therefore, more particularly resides in the conception and provision of a packing assembly employing a particular kind and form of O ring, for packing purposes, which may be formed of relatively tough, substantially non-deformable material having a low coefficient of friction. One such material which is suitable for the purposes of this invention is polytetrafluoroethylene which is commercially available under the trade name "Teflon." For convenience, the term "Teflon" is employed hereinafter to refer to that substance and to other substances having substantially similar characteristics.

Although Teflon (and perhaps other materials of a somewhat similar nature, which have been or may hereafter be developed) has a low coefficient of friction and resists breakdown or decomposition from a large variety of highly corrosive fluids which attack and destroy many available packing substances, it is substantially non-deformable. Also, it is difficult to mold or otherwise process Teflon to produce O rings commercially to a precise size. Consequently, and also because of the relative non-deformability of Teflon, it is extremely difficult to produce commercially a groove and Teflon ring assembly wherein the ring can easily be put in place in such a groove and about a shaft or the like and wherein the ring will function properly as a packing.

It is, therefore, an important object of the present invention to provide, for a packing assembly, an O ring of Teflon which need not necessarily be formed to the precise size of the annular clearance within which it is to be disposed for packing purposes between two relatively movable machine elements.

Related to the first-mentioned object is a further important object of providing, in a packing assembly a Teflon O ring, for packing purposes, which is capable of considerable radial deformation in order to enable it to be employed in an annular clearance between two relatively movable machine elements even though the ring, in its normal form, is somewhat thicker in radial dimension than the radial dimension of said clearance.

Another important object of this invention is the provision, for a packing assembly, of such an O ring of Teflon which may be produced commercially quite economically.

The foregoing and other objects of this invention are accomplished according to the present invention by utilizing an O ring of Teflon having a continuous, circumferential slot therein extending into the ring material from one side of the ring approximately to or slightly beyond the center thereof, or beyond the central or radial plane of the ring. In other words, the said slot extends in an axial direction. A further, more or less optional feature of the invention has to do with the particular angle at which the slot is arranged with respect to the axis of the ring.

As is well understood by those familiar with the use of O packing rings, they are ordinarily disposed in an annular groove in one or the other of two relatively movable, intertelescoping machine elements and, particularly where the said elements are relatively reciprocable, the ring shifts axially within the groove either in response to such reciprocation or in response to contained fluid pressure and thus contacts one or, alternately, both side walls of the groove. It is, therefore, generally desirable, although not absolutely essential, that the mentioned circumferential groove should not open at the precise center of either side wall of the ring which thus contacts the side wall of the ring groove on occasions, as such an arrangement, under some conditions, may impair the sealing effect of the ring.

In order to particularize and more clearly to explain and disclose the present invention, several variations of slotted Teflon O rings, usable within this invention, are shown for illustrative purposes in the accompanying drawing without, however, limiting the invention to the particular structures disclosed in said drawing. Thus, for illustrative purposes:

Figure 1 of the drawing is a perspective view of a Teflon O ring which is usable within the present invention, a portion thereof being cut away in order to show the ring in cross-section.

Figure 1:
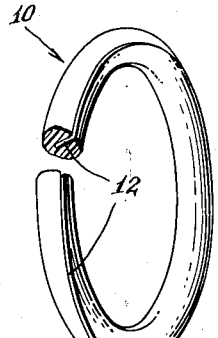

In Fig. 1 there is shown a circumferentially-slotted Teflon O ring 10, as viewed from the side, wherein there is provided a circumferential slot 12 which extends from the near side wall of the ring radially inwardly to approximately the center of the ring. Although the exact angularity of the slot 12 is not readily discernible from Fig. 1, nevertheless it may be considered that the ring 10 has the slot 12 formed therein at approximately the angularity thereof shown in Fig. 4. The view of ring 10 as afforded in Fig. 4 is as though that ring in Fig. 1 were viewed from the opposite side, that is to say, with the groove 12 facing away from the viewer.

Figures 4, 5, 6:
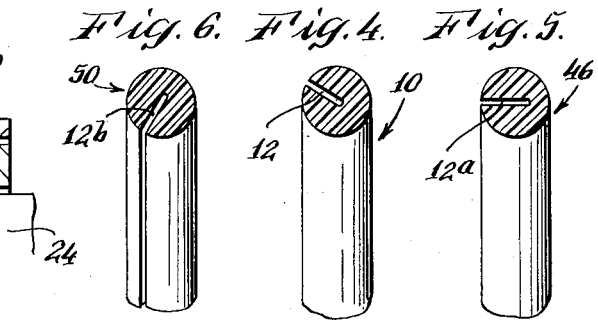
Fig. 4 is an enlarged fragmentary view of the Teflon O ring of Fig. 1, this view being partly in cross-section to show the disposition or direction of the slot formed therein.
Figs. 5, 6 and 7 are views, generally similar to Fig. 4, showing modifications of Teflon O rings within this invention.

From Fig. 4 it may be observed that the slot 12 extends angularly outwardly rather than being of a form wherein it would be parallel to the axis of the ring. However, it does not extend normal to the said axis but is disposed obliquely at approximately 60° from normal. The particular degree of angularity of the slot in the O ring is not critical. The most important point to observe is that the slot 12 extends angularly to the axis of the ring or, more broadly stated, it extends angularly to the direction of applied compressive force. There is some advantage, hereinafter explained, in avoiding having the slot open at the center of a side wall of the ring.

The function of the Teflon O ring and, more particularly, the function of the slot 12 may best be understood by considering an illustrative embodiment of an improved packing assembly or sealing device in which the ring may be used. For this purpose, reference is made to the structure of Figs. 2 and 3 wherein a wear insert 14 is sealingly supported by a rubber or rubber-like vibration ring 16 within a counterbore 18 of a machine casing 20 through an opening 22 in which extends a rotary shaft 24. A sealing device generally indicated at 26 is mounted upon the shaft 24 and arranged to turn therewith. This sealing device includes a mounting collar 28 which is fixedly associated with the shaft by means of a set screw 30. The mounting collar 28 telescopes within a surrounding sealing sleeve 32 which is capable of limited axial movement relatively to said collar, that movement being limited by reason of the fact that set screw 30 extends through an axial slot 34 formed in the sealing sleeve.

The mounting collar 28 is so positioned upon the shaft 24 that, when the set screw is at some intermediate point within the slot 34, the left end or nose 36 of the sealing sleeve will be in sliding contact with the opposed flat end surface 38 of the wear insert 14. Within the sealing sleeve 32 is a coil spring 40 which is compressed between the left end of the collar 28 and an inner shoulder 42 of the sealing sleeve 32 in order to urge the latter leftwardly, as viewed in the drawing. As the set screw 30 is within the slot 34, it follows that the sealing sleeve 32 turns with the shaft and the spring 40 maintains the nose 36 and the surface 38 of the wear insert in sliding sealing engagement during the operation of the device.

It may be noted that, in the sealing device above described, it is desirable to provide a static seal between the mounting collar 28 and the shaft 24 and to provide also a slightly shiftable or slidable seal between the mounting collar 28 and the sealing sleeve 32. In the absence of such seals, fluid could move in either direction along the shaft, which movement of course would be contra to the very purposes of the sealing device.

Figure 2:
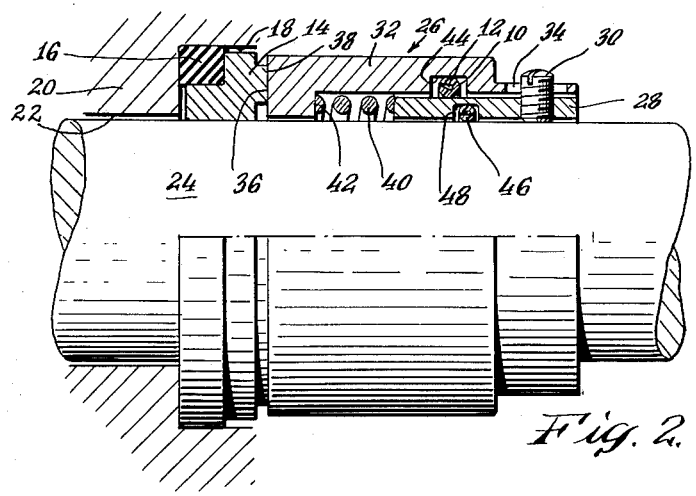
Fig. 2 is a view of a sealing device in which are employed two circumferentially-slotted Teflon O rings within the present invention, this device being shown in longitudinal section in the upper half of the drawing and in side elevation at the lower half thereof.
Figure 3:
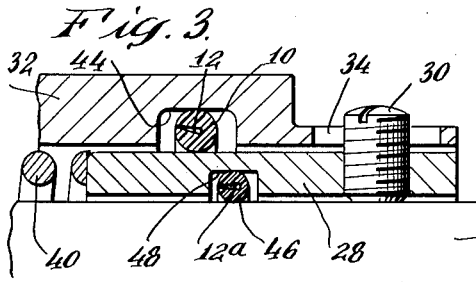
Fig. 3 is an enlarged view of the part of the structure of Fig. 2 wherein the said Teflon O rings are employed.

The means for effecting the seat at the two mentioned points in said sealing device may be Teflon O rings within the present invention, and such rings are shown in proper locale in Figs. 2 and 3 wherein there is shown a Teflon O ring such as ring 10, having an obliquely outwardly extending slot such as slot 12 therein similar to the slot arrangement shown in Figs. 1 and 4. The ring 10 is disposed within an internal annular groove 44 in the sealing sleeve 32 and arranged so that the outer periphery of said ring seats and seals against the bottom of said groove and the inner periphery of said ring seats and seals against the outer cylindrical surface of the mounting collar 28. The slot 12, shown fully open at its outermost point when the ring 10 is unstressed as shown in Fig. 4, becomes substantially closed when the ring is under radial compression as in Fig. 2. This closing of the slot permits the ring to be compressed radially to a greater extent than would otherwise be possible. The slots in all the O rings herein described function similarly to facilitate cross-sectional compression of the rings.

During operation of the shaft there may be slight axial movement of the sealing sleeve 32 relatively to the collar 28 arising from some condition such as, for example, end play in the shaft at its bearings. When an O ring of soft rubber-like material is employed at this point as has been done in the past with somewhat similar structures, the O ring, during such relative axial movement, may pursue a slight rolling motion and alternately engage the opposite side walls of the annular groove 44. However, because of the stiffness of the Teflon O ring 10 and also because of its relatively low coefficient of friction, it may slide but probably not roll to any appreciable extent back and forth within the groove 44, so that, because of the oblique disposition of the circumferential slot 12, the latter does not open into engagement with the adjacent side wall of said groove. Therefore, the slot cannot in any way conflict with any possible sealing effect between the O ring and the said side wall of the groove.

A second Teflon O ring 46 is provided as a static seal between the mounting collar 28 and the shaft and is shown as mounted within an inner annular groove 48 formed in said collar. This ring 46 may be identical with ring 10 except as to its diameter but, for the purpose of showing a possible variation of this invention, the Teflon O ring 46 is shown as of the character illustrated in Fig. 5, wherein a slot 12a is disposed approximately in parallelism with the axis of the ring. As ring 46 is employed as a static seal and may be somewhat more tightly compressed radially than would be appropriate in a shifting or sliding seal, the fact that slot 12a opens at the center of a side wall of the ring is of minor importance because a complete sealing effect is obtained at the ring's inner and outer peripheries.

If Teflon O rings are provided for use, as, for example, where rings 10 and 46 are used in the structure of Fig. 2, but if said rings lack the advantages of the circumferential slots according to this invention, then each of the rings, because of the extremely low deformability of the Teflon, must be of an extremely precise size in relation to the space wherein it is to be located. Furthermore, the conditions to be met are considerably accentuated in actual practice because the diameters of the ring grooves 44 and 48 or the outside diameters of the collar 28 or the shaft 24 may be slightly more or less than intended and it is difficult indeed to form Teflon rings to precise measurements.

Referring again to ring 10 for illustrative purposes: if that ring were a conventional, non-slotted Teflon O ring and if, in the usual sizes in which such rings are used, that ring, as compared to the annular space in which it should be disposed, were too large in outside diameter by as little as .005", it would buckle or tend to buckle at its inside periphery in assembly and thus result in improper assembly and leakage when put in service. On the other hand, if the same conventional Teflon O ring were small in its inside diameter by as much as .005", it might very well operate properly if assembly is accomplished, but such a tolerance would cause considerable difficulty in assembly depending on the taper of the end of the shaft upon which it is to be forced. The reason for these difficulties is that, although Teflon is slightly yieldable, it, nevertheless, is not sufficiently deformable in the cross-section in which it is ordinarily used in O rings to yield or be compressed radially to compensate for tolerances such as have been mentioned above. By rendering the Teflon O rings cross-sectionally compressible according to this invention, the tolerances to which such rings and related parts are made may be increased sufficiently to make it practical to manufacture such parts on a production basis.

Figure 8:
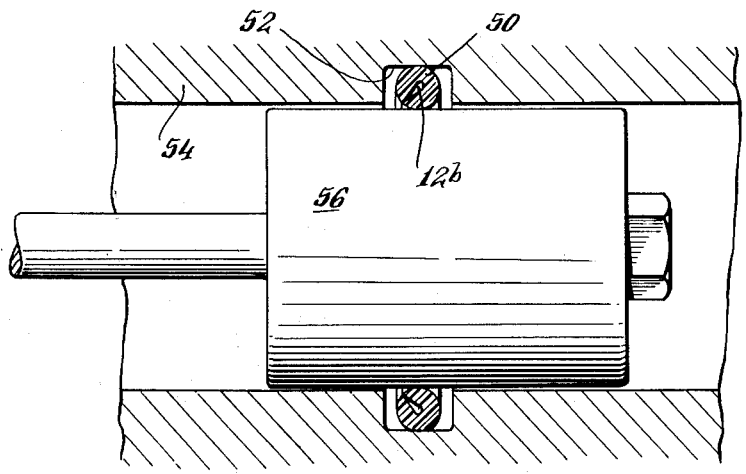
Fig. 8 is an axial view of a piston within a cylinder with a Teflon O ring according to this invention arranged as a means for effecting a seal for the piston.

Fig. 6 shows a Teflon O ring 50, having an oblique, circumferential slot 12b so formed that it opens toward the inner periphery of the ring. Such a ring is shown, in Fig. 8, disposed within a groove 52 formed within a cylinder 54 and effecting a seal between the bottom of said groove and the outer surface of a piston 56 arranged to reciprocate in said cylinder.

Figure 7:
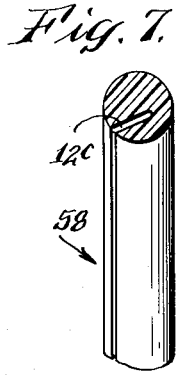

Fig. 7 shows a Teflon O ring 58 according to this invention, which differs from the other described and illustrated O rings chiefly in having a slot 12c which extends inwardly of the ring's cross-section from a point at one side of the ring in the vicinity of the latter's inner periphery to a point at the far side of the radial plane of the ring; the said slot passing through said plane at a point offset from the ring's center. It should be understood that such an oblique slot, instead of being disposed toward the inner periphery of the ring, could extend inwardly of the ring's cross-section from a point at one side of the ring in the vicinity of the latter's outer periphery to a point at the far side of the general or radial plane of the ring; such a slot passing through said plane at a point radially outward of the ring's center.

It should be observed that, in all the O rings illustrated in the accompanying drawing, the slots in the rings preferably extend at least slightly beyond the center of the ring's section or beyond the central radial plane of the ring, thus providing portions at opposite sides of the slot which may hingedly move toward each other about a hingeline corresponding approximately to the bottom of the slot. The closing of the slot under radial compression results in appreciable radial compression of the ring and such appreciable compressibility of the ring renders it useful and highly advantageous for the purposes stated.

It may be seen from the foregoing description and from the accompanying drawing that the provision of circumferential slots in an O ring of Teflon or of similar material according to this invention enables the use of Teflon O rings which need not be formed to such close tolerances as would be necessary in a non-slotted Teflon O ring. At the same time, the efficiency of such rings is maintained because such a slot opens at a point remote from the actual peripheral sealing points or surfaces of the O ring and thus does not interfere in any way with the ring's sealing effect. Thus, the present invention affords the advantages of Teflon in an O ring without suffering the disadvantages thereof.

As this invention may obviously be practiced in various ways, it should not be limited in scope except as set forth in the accompanying claims.

What we claim is:

1. A packing assembly comprising portions of two intertelescoping parts to be sealed, which portions have opposed cylindrical surfaces, non-variably spaced relatively to each other, defining an annular packing space therebetween; and, tightly disposed in said space, a packing ring of circular shape in radial axial section, of substantially noncompressible material, and having a continuous, concentric slot which, in its depth dimension, extends from a side surface of the ring to a location therewithin to at least a plane coincident with the lines of contact of said ring with said cylindrical surfaces, the diameter of the ring's section at said plane being greater, when the ring is unstressed, than the spacing between said cylindrical surfaces, and portions of said ring at opposite sides of said slot being yieldably pressed toward each other by such contact of the ring with said cylindrical surfaces, thereby reducing the ring's mentioned diameter and enabling its disposition in said packing space.

2. A packing assembly according to claim 1, further characterized in that one of said cylindrical surfaces of one of said intertelescoping parts defines the bottom of an annular groove in which said packing ring is disposed; said groove having opposed side walls approximately parallel to said plane, and said slot opening at a circular line which is equidistant from said lines of contact of the ring with said cylindrical surfaces.

3. A packing assembly according to claim 1, further characterized in that one of said cylindrical surfaces of one of said intertelescoping parts defines the bottom of an annular groove in which said packing ring is disposed; said groove having opposed side walls approximately parallel to said plane, and said slot opening at a circular line less than 90° removed from one of said lines of contact of the ring with said cylindrical surfaces.

4. A packing assembly according to claim 3, further characterized in that said slot opening is nearer to the outer periphery than to the inner periphery of said ring.

5. A packing assembly according to claim 4, further characterized in that said slot opening is nearer to the inner periphery than to the outer periphery of said ring.

6. A packing assembly according to claim 4, further characterized in that said slot, in its depth direction as viewed at an axial section through the ring, extends through said plane at a point offset from the ring's center.

References Cited in the file of this patent

UNITED STATES PATENTS

| | | |
|---|---|---|
| 2,521,248 | Parker | Sept. 5, 1950 |
| 2,590,759 | Dale et al. | Mar. 25, 1952 |
| 2,690,360 | Young | Sept. 28, 1954 |

FOREIGN PATENTS

| | | |
|---|---|---|
| 462,424 | France | Nov. 22, 1913 |

OTHER REFERENCES

Article entitled "Teflon, Components and Coatings," Product Engineering for Sept., 1952 pages 149–153 (Copy—Class 288—Patent Office.)